United States Patent [19]

Levin

[11] 4,004,552

[45] Jan. 25, 1974

[54] EGG INCUBATING TRAY WITH RACK AND SLIDE

[76] Inventor: Gerd Levin, Ernst August Str. 13A, Hamburg 52, Germany

[22] Filed: June 9, 1975

[21] Appl. No.: 584,739

Related U.S. Application Data

[63] Continuation-in-part of Ser. No. 480,294, June 17, 1974, abandoned.

[52] U.S. Cl. .................................................. 119/43
[51] Int. Cl.² ....................................... A01K 41/00
[58] Field of Search ............. 119/43, 44; 217/26.5, 217/29; 206/504; 220/23.4; D9/190

[56] References Cited

UNITED STATES PATENTS

| | | | |
|---|---|---|---|
| 1,544,311 | 6/1925 | Graffenberger | 229/28 |
| 2,006,938 | 7/1935 | Birkenhauer | 249/120 |
| 2,061,064 | 11/1936 | De Reamer | 229/29 |
| 2,087,044 | 7/1937 | Reiners | 119/43 |
| 2,143,536 | 1/1939 | Blau | 229/29 |
| 2,255,036 | 9/1941 | Gedge | 119/43 |
| 2,285,129 | 6/1942 | Schwartzberg | 229/2.5 |
| 2,351,754 | 6/1944 | Friday | 217/26.5 |
| 2,423,756 | 7/1947 | Chaplin | 229/2.5 |
| 2,517,465 | 8/1950 | Cox | 229/28 X |
| 2,636,660 | 4/1953 | Brown | 217/26.5 X |
| 3,147,738 | 9/1964 | Theilig | 119/43 |
| 3,281,003 | 10/1966 | Pesut, Jr. | 217/26.5 |
| 3,489,124 | 1/1970 | Cannon | 119/43 |
| 3,675,806 | 7/1972 | Noguchi | 217/26.5 |
| 3,817,215 | 6/1974 | Levin | 119/43 |
| D95,291 | 4/1935 | Sherman | D9/190 |
| D148,488 | 1/1948 | Shank | D9/190 |

FOREIGN PATENTS OR APPLICATIONS

| | | | |
|---|---|---|---|
| 7,137,055 | 1/1972 | Germany | 119/43 |
| 591,052 | 4/1959 | Italy | 119/43 |

Primary Examiner—Hugh R. Chamblee
Attorney, Agent, or Firm—Stephen E. Feldman

[57] ABSTRACT

An egg incubating tray has its egg cells arranged in a manner so that a large number of egg cells are located on each tray. The egg cells are arranged in a diagonal pattern of parallel rows, each row being offset from the rows of each side of it. The two sides of each tray parallel to the rows thereof are straight whereas the other two are jagged, conforming to the layout of the projecting arrangement of the egg cells. This arrangement permits egg trays to intermesh when trays are placed together with their rows colinear so that the projecting cells of one tray fit into the spaces between the projecting cells of the other tray. Each cell may be surrounded by upwardly disposed, tapered projections. These projections are positioned to hold the eggs, separate one egg from another and also to act as a shock absorber so that the eggs are less subject to breakage. Horizontally disposed projections may also be positioned in each cell, extending inwardly from a side of the egg cell. Each of these horizontal projections has smooth edges so that there are no sharp edges extending inwardly toward the egg. Reinforcing struts extend along the underside of the tray along the sides of the cells to strengthen the tray. The cell and strut arrangement permits the free-flow of gases and thermal currents throughout the egg tray during incubation. There are also vertically projecting supports extending from four locations on the top surface of the tray and positioned so that the trays can be stacked one upon the other. The rack can be formed of four sides, each of L-shape and configuration, arranged to accommodate three intermeshed trays. A slide may be provided to initially receive the intermeshed egg incubating trays and to facilitate their disposition in the rack.

30 Claims, 13 Drawing Figures

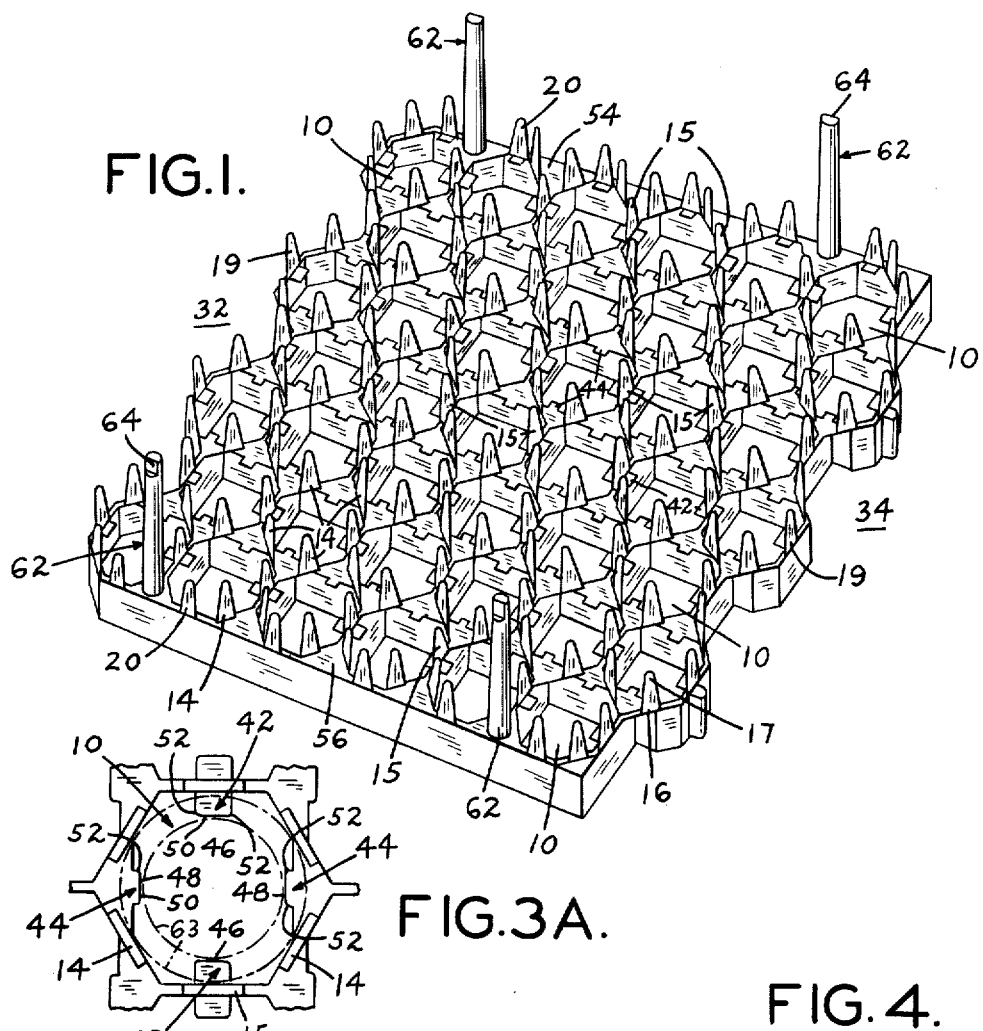
FIG.1.
FIG.3A.
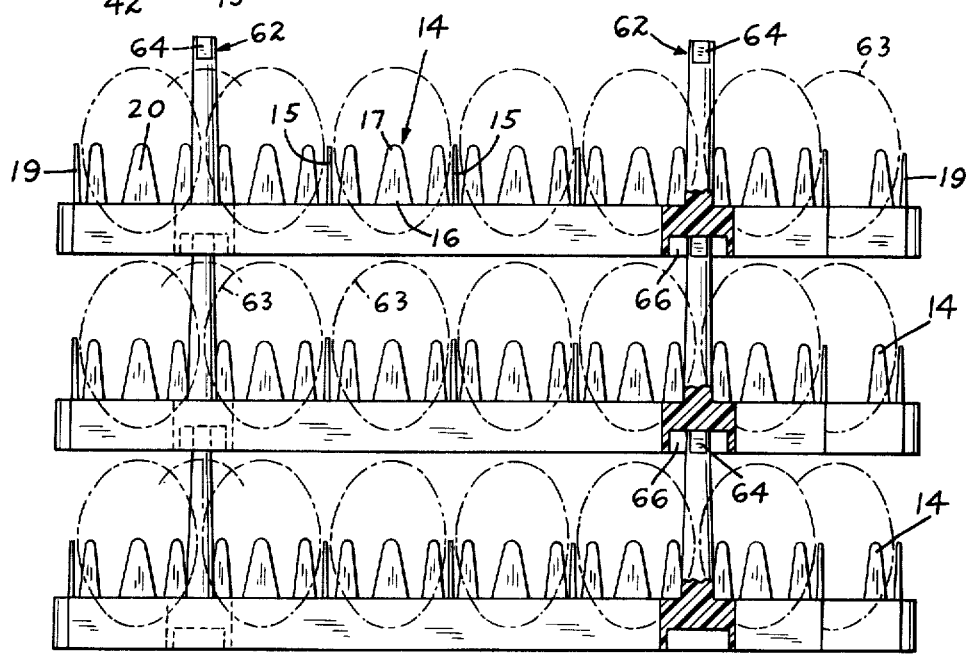
FIG.4.

EGG INCUBATING TRAY WITH RACK AND SLIDE

RELATED APPLICATION

This application is a continuation-in-part of my co-pending application "Egg Incubating Tray with Rack and Slide" filed June 17, 1974, as Ser. No. 480,294 now abandoned.

BACKGROUND OF THE INVENTION

This invention relates to egg trays and particularly to an egg incubating tray which provides for a maximum amount of egg cells in a tray, the rack for positioning a plurality of intermeshed trays in the incubator, and a slide for facilitating the disposition of such trays in the rack.

In the art of egg incubation the principal desire has been to provide incubation equipment that will result in the maximum amount of hatched eggs, that is, the least amount of eggs that break during incubation and also tha maximum amount of eggs that can be positioned in the incubator. There have been many attempts to place more and more eggs in the incubator and at the same time prevent the breakage of eggs during incubation. In the usual situation, each rack in an incubator holds three identical trays. The rack is approximately 36 by 12 inches and each of the trays is about 12 by 12 inches. The desire is for each of the trays to hold as many eggs as possible. The usual egg tray, as in U.S. Pat. No. 3,147,738 to Thelig, can hold only 36 ordinary sized eggs in a square grid pattern. This square grid pattern is extremely limiting since three of these trays can only hold 108 eggs.

Another egg tray which increased the number of eggs in each tray is the tray disclosed in applicant's U.S. Pat. No. 3,817,215. The tray of this patent has a diagonal pattern of egg cells, with the parallel rows being perpendicular to the straight edges of the tray (as shown in FIGS. 2 and 3). This increased the amount of eggs in each tray to 48. However, it still resulted in lost space. The space at the end of each row (designated 44, 46, 48 and 50 in FIG. 2 of the patent) is not used. Similarly, the space around vertical struts 52 is also not used. When three of these trays are positioned together, as shown in FIG. 5 of the patent, even though they can hold 144 eggs, the lost space is still not utilized. Therefore, the egg trays shown in the patent substantially increased the number of eggs that could be held on a rack, but still did not make use of some space that was available.

Further, the tray of U.S. Pat. No. 3,147,738 can only hold 36 ordinary sized chicken eggs and cannot hold large chicken eggs or turkey eggs. If the same arrangement were used for these larger eggs, far less than 36 eggs could be placed in a tray.

Therefore, it would be desirable to provide egg trays having sufficient egg cells to receive a larger number of eggs per tray in no more space than the present egg trays.

SUMMARY OF THE INVENTION

An egg tray is provided having a pattern of egg cells so that 56 ordinary or 42 large eggs can be accomodated in the same size tray that now accomodates 48 ordinary size eggs. The construction includes a diagonal pattern of parallel rows, each row being offset from the rows on each side of it. The rows are parallel to two straight sides of the tray and project in a jagged manner on the other two opposite sides of the tray. This projecting arrangement permits egg trays to intermesh when they are placed together. The projecting cells of one tray fit into the spaces between the projecting cells of another tray. Almost all available space is used. In this arrangement, the rows of a tray will be colinear with the rows of the tray with which it is intermeshed and the diagonal pattern will be continuous throughout the intermeshed trays. Each tray can now hold 56 ordinary size eggs in the same space that previously held 36 or 48 eggs and can hold 42 large eggs in that same space.

Each of the cells has six tapered projections positioned around it to cradle the eggs and provide shock absorption for them. Four additional projections may be positioned in a horizontal manner within each egg cell to add to the cradling and shock absorbing effect. A slide is provided to facilitate placing three interfitted egg trays onto a rack. The rack, which also consists of a novel and simplified construction, receives the three interfitted egg trays for disposition within the incubator.

The object of this invention is then to provide incubation egg trays having a maximum amount of egg cells for a set size, that is 56 ordinary size egg cells instead of 48 or 36 and 42 large egg cells in the space that now holds 48 or 36 ordinary size egg cells.

It is a further object to provide an interfitting arrangement for the trays so that three egg trays will form a continuous interlocking egg tray with all the rows of eggs aligned.

It is a further object of this invention to provide projecting cells on the egg trays which intermesh to form the interfitting arrangement.

It if a further object to provide an incubating egg tray having shock absorbing means for holding and cradeling the eggs so that there is the least possible amount of breakage.

A still further object of the invention is to provide a novel slide which facilitates the disposition of the interlocking egg trays into a rack.

A still further object of the invention is to provide a rack for receiving the interlocking egg trays and positioning same within an incubator.

BRIEF DESCRIPTION OF THE DRAWINGS

FIG. 1 illustrates a perspective view of an egg tray incorporating the instant invention.

FIG. 3a illustrates a single egg cell.

FIG. 4 illustrates a stacking arrangement for a number of egg trays.

PREFERRED EMBODIMENT OF THE INVENTION

Figure 2:
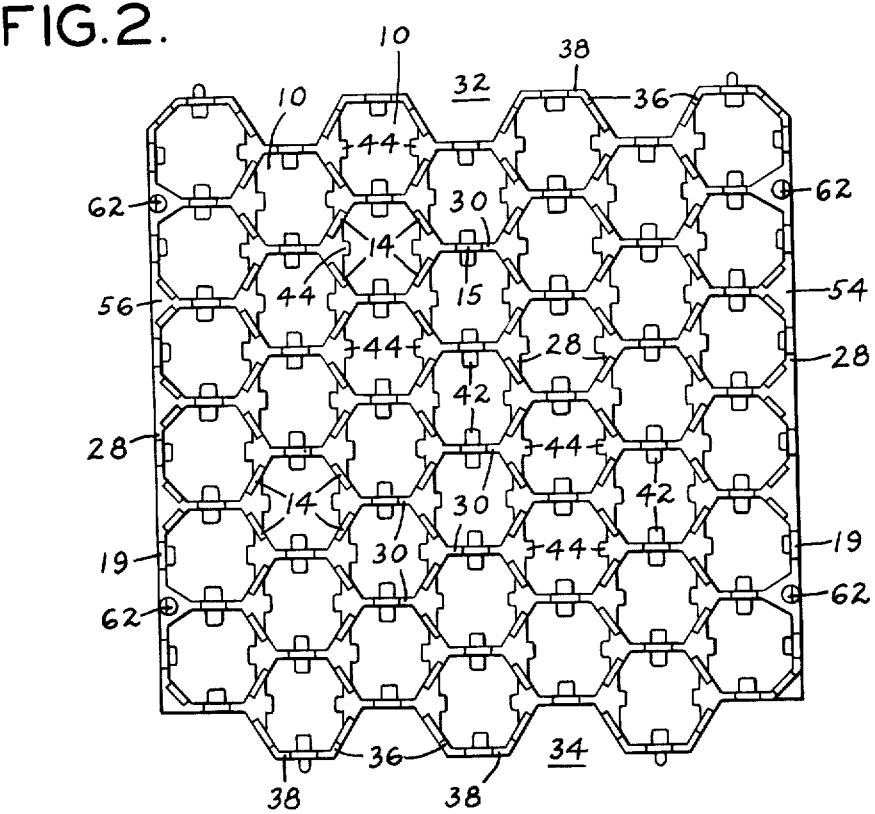
FIG. 2 illustrates a top plan view of the egg tray of FIG. 1.
Figure 3:
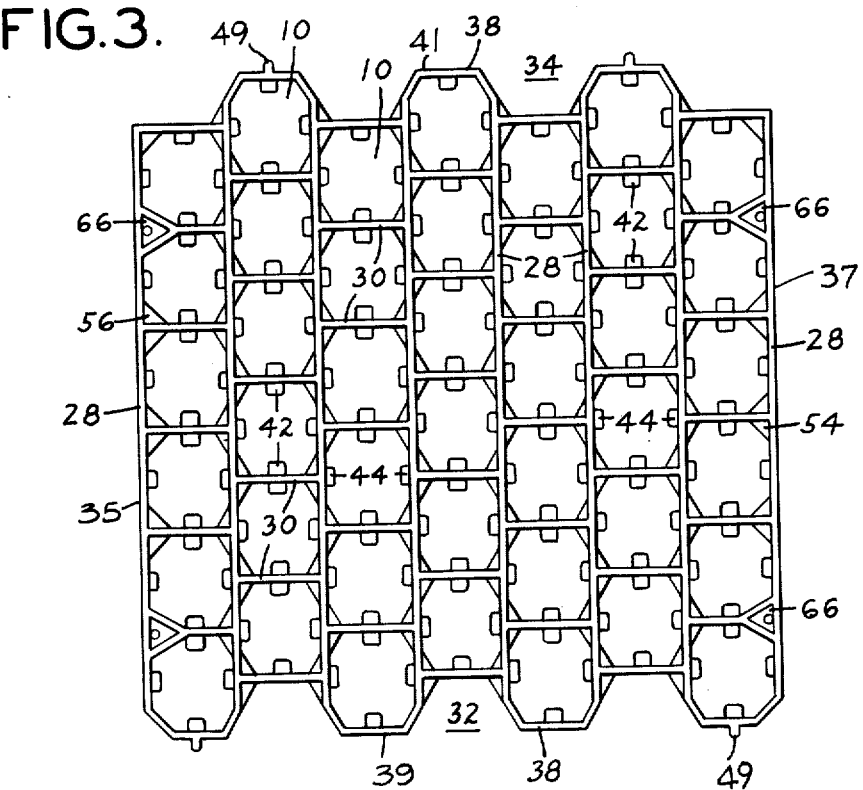
FIG. 3 illustrates a bottom plan view of the egg tray of FIG. 1.

This invention relates to incubating egg trays and racks and carriers therefor. The construction includes an egg tray as shown in FIGS. 1, 2 and 3 which has a staggered arrangement of egg cells so that 42 large egg cells are provided in the space that normally holds 48 or 36 ordinary size egg cells. Thus, an egg tray is provided with substantially increased egg holding capacity. The large eggs would be very large chicken eggs or turkey eggs, whereas the ordinary size eggs would be ordinary to large size chicken eggs. For example, the large eggs would have a diameter of about 1-¾ whereas, the ordinary size eggs would have a diameter of about 1-⅝.

The structure of the tray includes seven rows of cells 10. Each row includes six cells and is offset by approximately half the width of an egg cell 10 from the cells 10 in the adjacent row. In other words, taking the row shown on the extreme left in FIGS. 2 and 3, the cells 10 in that row are offset by half the width of a cell 10 from those in the row immediately to its right. The same pattern exists in all seven rows of the cells 10. This permits cells to be provided without one egg contacting another.

The eggs will be positioned as shown in FIG. 4 so that the greatest circumference of one egg will not interfere with the greatest circumference of the egg adjacent to it in the next row. Thus, as shown by the dotted lines in FIG. 2, the egg positioned in the top left cell 10' will not interfere with the egg positioned in the cell 10" immediately to the right of it in the adjacent row, even though both of these eggs extend along a straight line which divides one row from the next. If they were not in this offset arrangement the eggs would interfere with each other and would break during incubation, or a great amount of wasted space would have to be provided.

Each of the 42 egg cells 10 has six vertical projections surrounding it. (It will be noted that some of these, such as those near posts 62 may be omitted, as shown in FIG. 1). Four of these projections 14 (FIGS. 1 and 2) are positioned at an angle of about 30° and are isoceles triangles in shape. They can be tapered so that the base 16 (FIG. 1) is much thicker than the tip 17 to provide for flexibility to provide added shock absorbing qualities. It will be appreciated that if less than six are provided, the eggs will not be held as securely and some breakage could result.

When an egg is placed into a cell 10, these projections have to flex so as not to injure the egg. The same shock absorption has to take place if a tray is moved during incubation. The tips 17 of the projections 14 are also rounded to avoid sharp points. There are also two more of these projections 15 which are positioned between egg cells 10 in the same row.

Therefore, for each normal egg cell 10 there will be six projections 14, and 15 surrounding the cell and positioned so as to form a circle and properly support the egg. These projections also cooperate to support the eggs in adjacent cells 10. Therefore, each of these projections 14 and 15 acts to support two adjacent eggs. This is, of course not true with respect to the projections on the outer periphery, that is, projections 19 and 20. However, other than this dual support function these act in exactly the same manner as the other projections.

The tray itself is moulded or otherwise formed out of plastic or other strong material so that it comprises one integral section of material.

To support the tray there are eight longitudinal struts 28 (FIG. 3); positioned so that they define the rows of egg cells 10. Ribs 30 are then positioned between egg cells in the same row to interconnect struts 28. These ribs and struts may be rectangular, triangular or any other suitable shape in crosssection.

It will be noted that as shown in FIG. 3, rectangular open areas are formed by 28 and ribs 30. These areas correspond with the egg cells 10 and thereby provide for free-flow of gases throughout the incubation chamber.

It is also noted that for the egg cells 10 making up the ends of each row, that is the forward end 32 (FIGS. 2 and 3) and rear end 34, that instead of a continuous strut there are short struts which are somewhat arching in configuration. These are comprised of two short members 36 which are at about an angle of 30° with respect to struts 28. They are, in turn interconnected by short struts 38 to form forward end 32 and rear end 34.

Two of the edges 35 and 37 of the tray are straight, two of the struts 28 form these edges. The other two edges 39 and 41 of the tray are jagged. These edges are formed by the offset projecting cells. As shown in FIG. 2, the top cell on the leftmost row and the top cell on the third row from the left project further than the top cell in the second row from the left. This will form a space which is approximately half a cell in size. As aforementioned, the edges of each of the projecting cells are formed of two short 30° members 36 so that the space between the projecting cells is trapezoidal in shape and thus substantially the same trapezoidal shape as the projecting half one each of the projecting cells. Thus, when two or more trays are placed together, as shown in FIG. 5, the projecting cells in one tray 70 will fit into the spaces between the projecting cells in the next tray 71 to make full use of all the available space.

Figure 5:
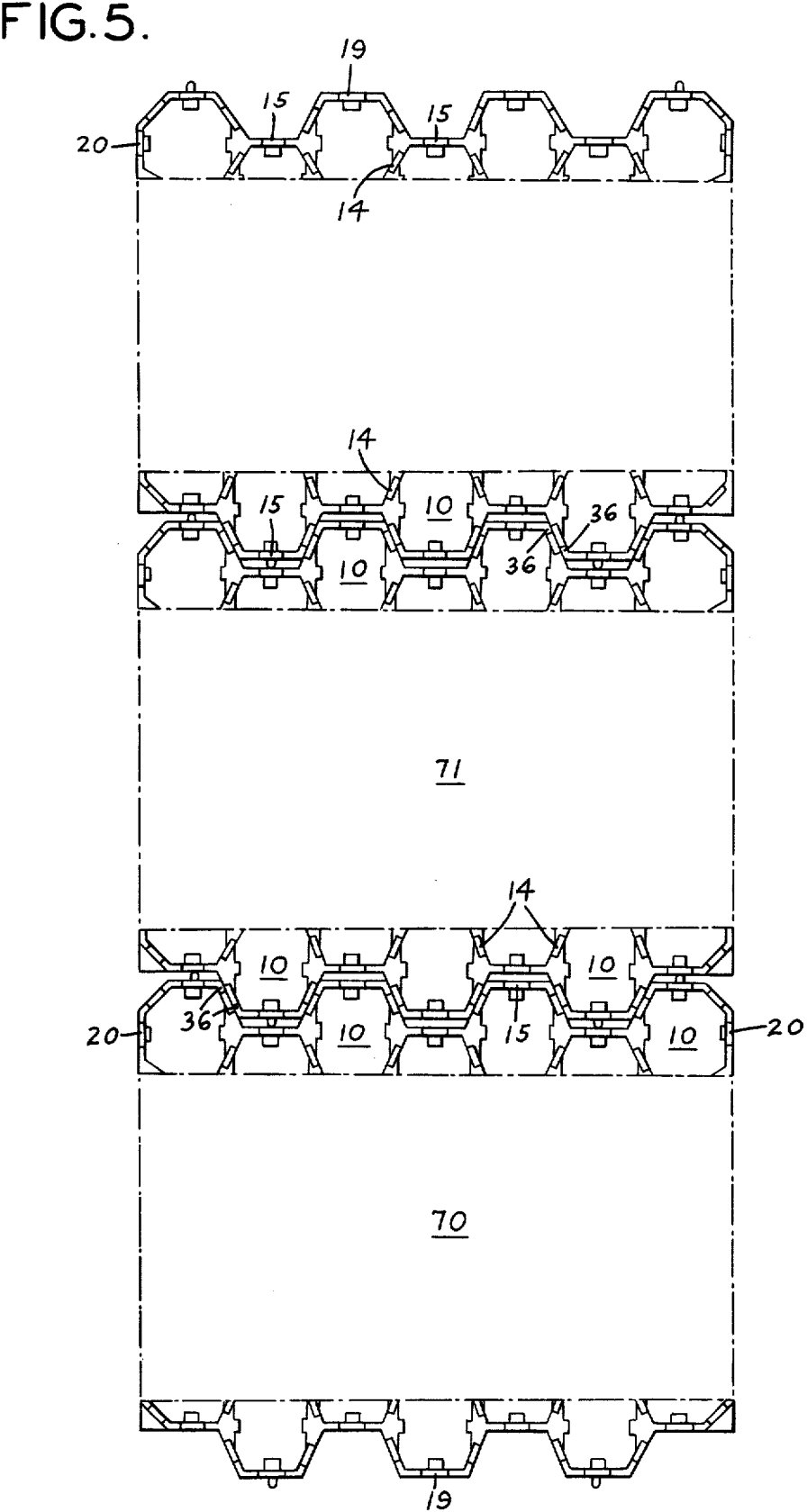
FIG. 5 illustrates the interlocking end arrangement for a three of such trays when they are placed in a rack.

When three trays are placed together as shown in FIG. 5 and placed on a rack, the only loss of space will be at one end of each of the outside trays, trays 70 and 72 in FIG. 5. This is a much smaller loss than with the diagonal arrangement of U.S. Pat. No. 3,817,215, where as aforementioned, there is a loss of space along the straight edges of each cell (specifically areas, 44, 46, 48 and 50, and the space alongside the vertical struts). This loss of space has been substantially reduced by the present invention. The total loss of space occuring at the ends of trays 70 and 72 is approximately 7 half cells or 3-½ cells when a total of 42 × 3 or 126 cells are provided, or a loss of 2.8% of the space available, whereas with the structure of U.S. Pat. No. 3,817,215 there is a loss of half a cell in each row or 4 cells per tray or a total of 12 cells for three trays having 48 × 3 or 144 cells or an 8.3% loss of space. Thus, the amount of lost space is significantly less.

It will be appreciated that the tray described only had 42 cells per tray whereas the tray of the aforementioned U.S. patent has 48 cells per tray. The difference in number of cells is because the cells of the tray of the present invention are larger cells, for example they are designed to accomodate eggs having a diameter of 1-¾" whereas the cells of the U.S. Patent are for eggs having a diameter of 1-⅝". A tray using the present invention for eggs having a diameter of 1-⅝" is described subsequently. In that tray 56 egg cells are provided instead of the 48 of the U.S. Patent.

It is noted that in the present embodiment there are extensions 49 which extend from the outer projecting cells of each tray. These extensions are simply provided to cause the three trays as shown in FIG. 5 to completely fill up a standard rack (36 inches long). If the racks were shorter the extensions would not be needed.

To further the eggs four horizontal projections are positioned within each egg cell 10. These consist of projections 42 (FIG. 2) which extend from ribs 30 and projections 44, which are positioned in a central fashion between adjacent ribs 30 and at a point which corresponds to the plce where the rib 30 for the eggs in an adjacent row connects to the strut 28. For example, for the second egg cell from the top in the third row from the left in FIG. 2, projection 44 is at the same point where the rib 30 between first and second cells in the fourth row joins strut 28. This provides for a strengthening of the projection 44. Projections 42 and 44 are also positioned so that their leading edges 45 and 48 respectively are the same distance from the center of egg cell 10. That is, the radius of the center of the egg cell to leading edge 46 is the same as the distance to leading edge 48. This is true even though projections 42 are longer than projections 44.

The shape of leading edges 46, and 48 is such that each of them has a flat central section 50 (FIG. 3a) and two curved radii 52. (FIG. 3a). This prevents any sharp edges from contacting the egg.

All four projections 42, 44 extend a finite distance from the sides and are shaped like tabs to provide the requisite amount of flexibility. If they were inflexible they might rupture the shell of an egg as it was dropped or placed into its egg cell. Along this line, it will be appreciated that when the eggs are placed in the cells, they are invariably dropped a short distance in the cell. Thus, it is quite important to have a shock absorbing quality. This is achieved by means of projections 14 and 15 and projections 42 and 44.

Areas 54 and 56 extend along the sides of the egg tray and are filled with plastic to provide strength for the tray.

There are four large tubular supports 62 (FIGS. 1 and 2) which extend vertically up from the egg tray. These supports are cylindrical and taper slightly from a wider base to a slightly smaller flat tip 64 (FIG. 4) and may be hollow to provide the least weight. Underneath each of these supports 62 is a small recess 66 (FIG. 3) and also short struts adjacent to the opening to reinforce the areas surrounding the supports. The supports are provided so that, as shown in FIG. 4, the egg trays can be stacked on each other. When they are thus stacked, the tips 64 which may be slightly flattened, fit into recesses 66 so as to provide for a secure stacking arrangement. It will be appreciated that the length of supports 62 is such that they are longer than the maximum length of the eggs, as shown by dotted lines 63 so that they do not permit the eggs in one tray to contact and possibly rupture the eggs in the next tray.

While the vertical projections 14 and 15 at the edges of each tray do not actually support the eggs in the adjacent trays, they do contact each other (as shown by projections 14' and 15' in FIG. 5) to provide increased support and strength to the trays.

Figure 6:
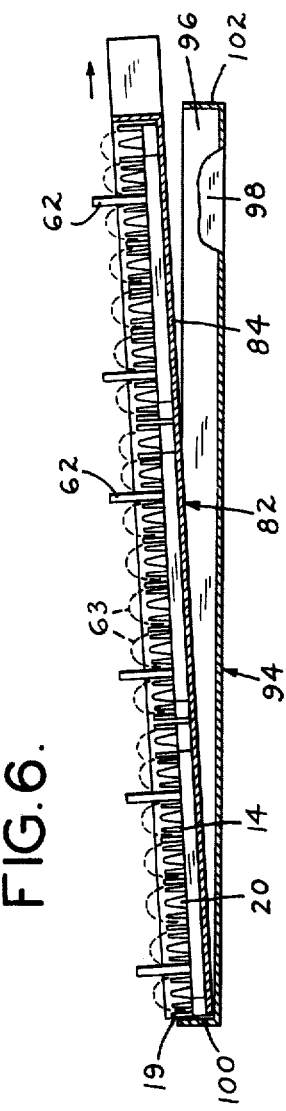
FIG. 6 illustrates a perspective view of a slide with a number of interfitted egg trays thereon disposed in alignment with a rack which is to receive the interfitted trays, cut away in part to better show details thereof.
Figure 7:
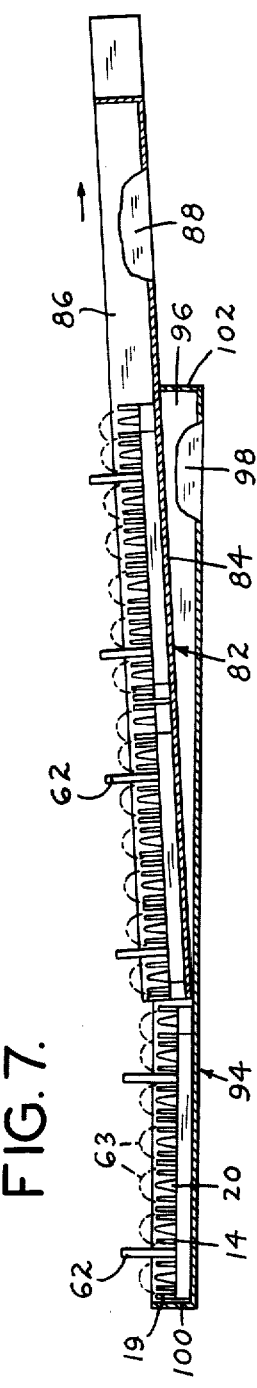
FIG. 7 illustrates the slide of FIG. 6 being withdrawn.

Three trays of eggs are interfitted as shown in FIGS. 5 and 6 and then placed on a slide 82 as shown in FIG. 6. Slide 82 comprises a rectangular flat sheet 84 preferably made of metal or other strong material. Sheet 84 is then turned up along is side edges 86 and 88 to make it rigid. Edges 86 and 88 furthermore extend forward in front of sheet 84 to form handles which facilitate use of slide 82.

Slide 82 is utilized when it is desired to place three interfitted egg trays into a rack 94. Rack 94 is adapted for disposition within the incubator and includes two L-shaped longitudinal side members 96 and 98 and two L-shaped longitudinal bracing members 100 and 102 which interconnect members 96 and 98.

As aforementioned, the tray of FIGS. 1-5 is especially adapted for large eggs such as very large chicken eggs or turkey eggs. FIG. 8-12 illustrate another embodiment of the present invention having 56 egg cells for use with ordinary size eggs, such as the chicken eggs as used for the trays of U.S. Pat. Nos. 3,817,215 and 3,147,738.

The structure of this tray includes the eight rows of seven cells 80 apiece. Each row is offset by approximately half the width of an egg cell from the cells in the adjacent row as with the embodiment of FIGS. 1-5. This tray is identical to the embodiment of FIGS. 1-5 except that there are eight rows instead of seven and each row has seven cells instead of six.

The eggs will be positioned as shown in FIG. 1 so that the greatest circumference of one egg will not interfere with the greatest circumference of the egg adjacent to it in the next row. Thus, as shown by the dotted lines in FIG. 9, the egg positioned in the top left cell 80' will not interfere with the egg positioned in the cell 80" immediately to the right of it in the adjacent row.

Each of the 56 egg cells 80 has vertical projections surrounding it - in the same manner as previously described. These can be four projection 84 which are positioned at an angle of 30° and are isoceles triangles in shape and can be tapered for flexibility.

Figure 8:
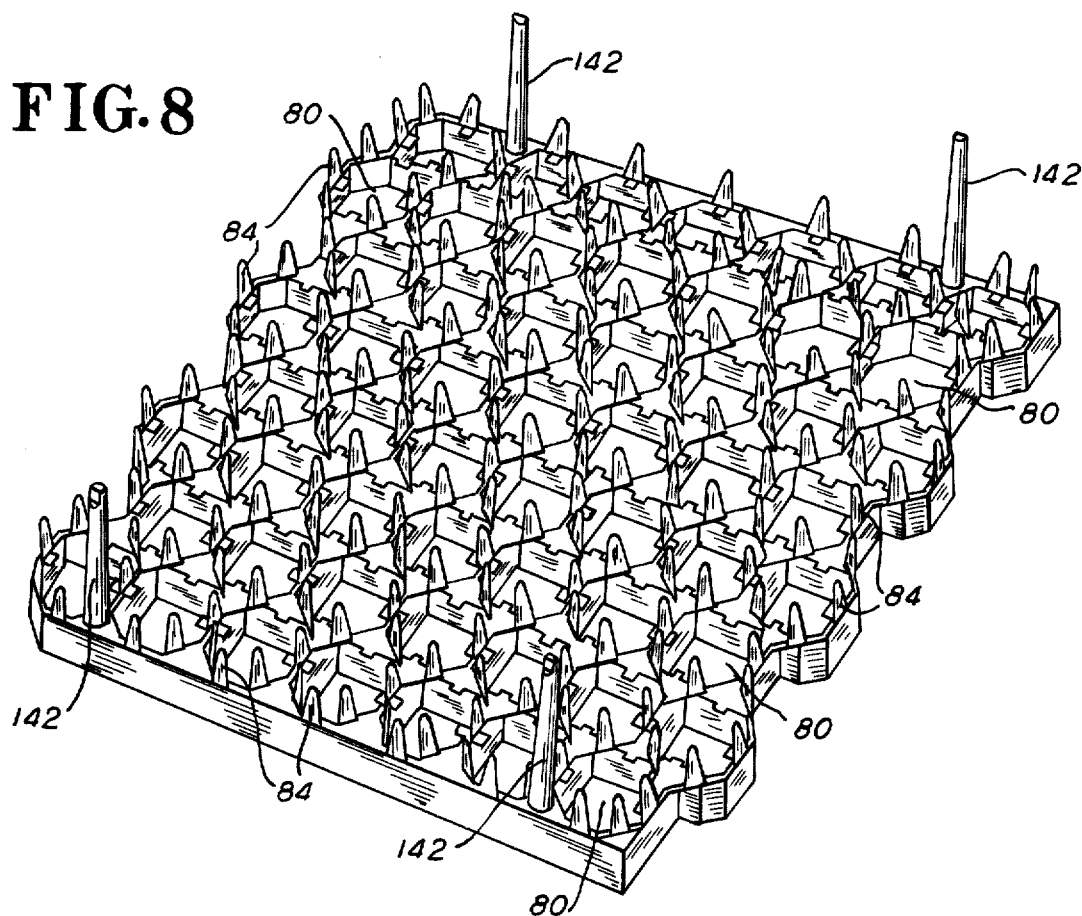
FIG. 8–12 illustrate an alternative form of the invention.
Figure 9:
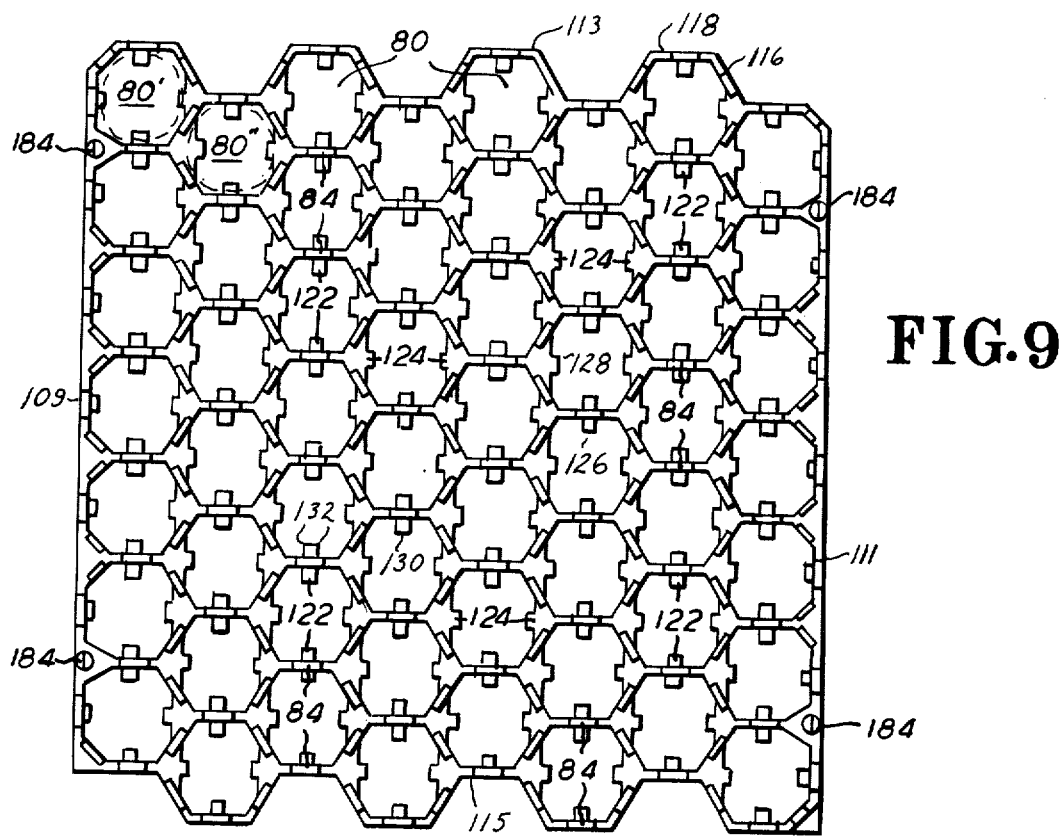
Figure 10:
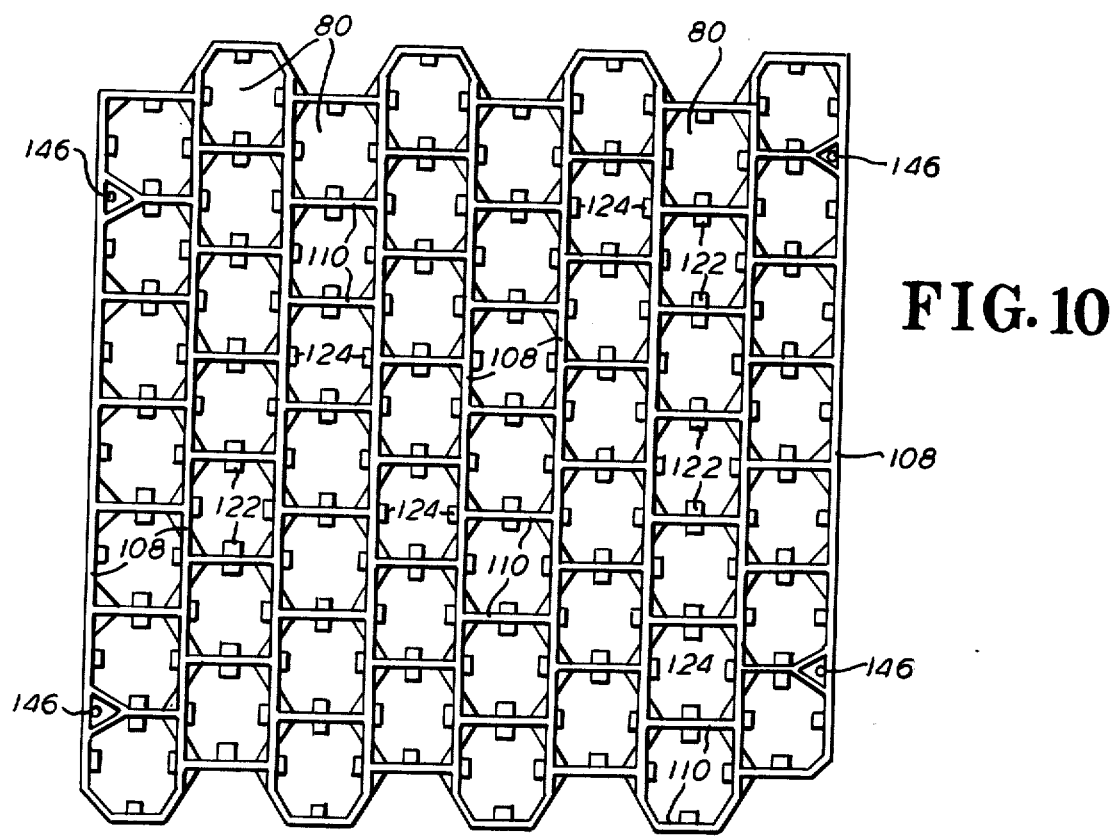

The struts and ribs 108 and 110 of this tray are constructed in the same manner as the tray of FIGS. 1-5, to form rectangular areas, except that there are nine struts instead of eight as shown in FIGS. 8 and 9 so that 8 rows of cells are formed. There are also eight ribs instead of seven so that seven cells are formed in each row.

The edges of each tray are the same as in the embodiment of FIGS. 1-5, with two straight edges 107 and 111 which are formed by the struts and two jagged edges 113 and 115 which are formed by the projecting cells. Each of these projecting cells has short somewhat arching struts 116 which are positioned at an angle of about 30° with respect to the struts 108. These struts are connected together by strut 118.

The projecting cells form spaces between them which are somewhat trapezoidal in shape. This is substantially the same shape as the projecting half of each of the projecting cells. Thus, when two or more trays are placed together as shown in FIG. 12, the projecting cells in one tray 143 will fit into the spaces between the projecting cells in the next tray 145 to make full use of all available space.

Figure 12:
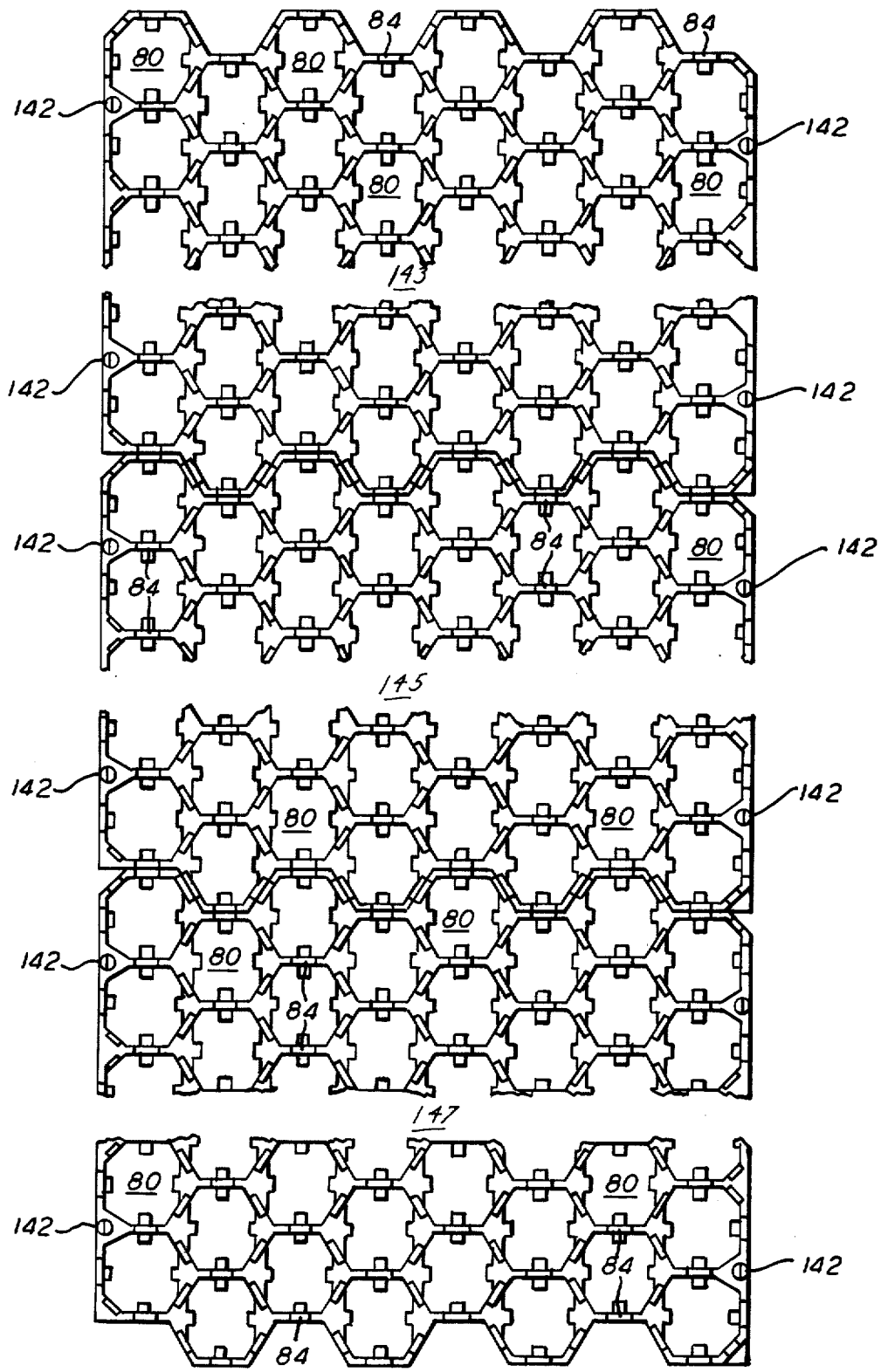

When three trays are placed together as shown in FIG. 12 and placed on a rack, the only loss of space will be at one end of each of the outside trays, trays 143 and 147 in FIG. 12. This is a much smaller loss than with the diagonal arrangement of U.S. Pat. No. 3,817,215. With that arrangement, there is a loss of 4 cells per tray (as aforementioned) or a total of 12 cells in three trays whereas with the present arrangement there is only a loss of 8 half cells, 4 at each end, or a total of 4 cells. Thus, with the present invention 56 cells can be provided in each tray or a total of 168 cells as compared to 48 cells in each tray of the patent or a total of 144 cells.

Each cell can have four horizontal projections 122 and 124 (FIG. 9) which extend from ribs 110 and struts 108 in the same manner as in the embodiment of FIGS. 105. These projections are also positioned so that their leading edges 126 and 128 are the same distance from the center of an egg cell. Each of the projections are somewhat flexible and include a central section 130 and two curved radii 132 for the same reason as in the embodiment of FIGS. 1–5. If desired, fewer then four projections can be provided or they can be eliminated entirely. The eggs will not be held as securely but they will be held to some extent.

Figure 11:
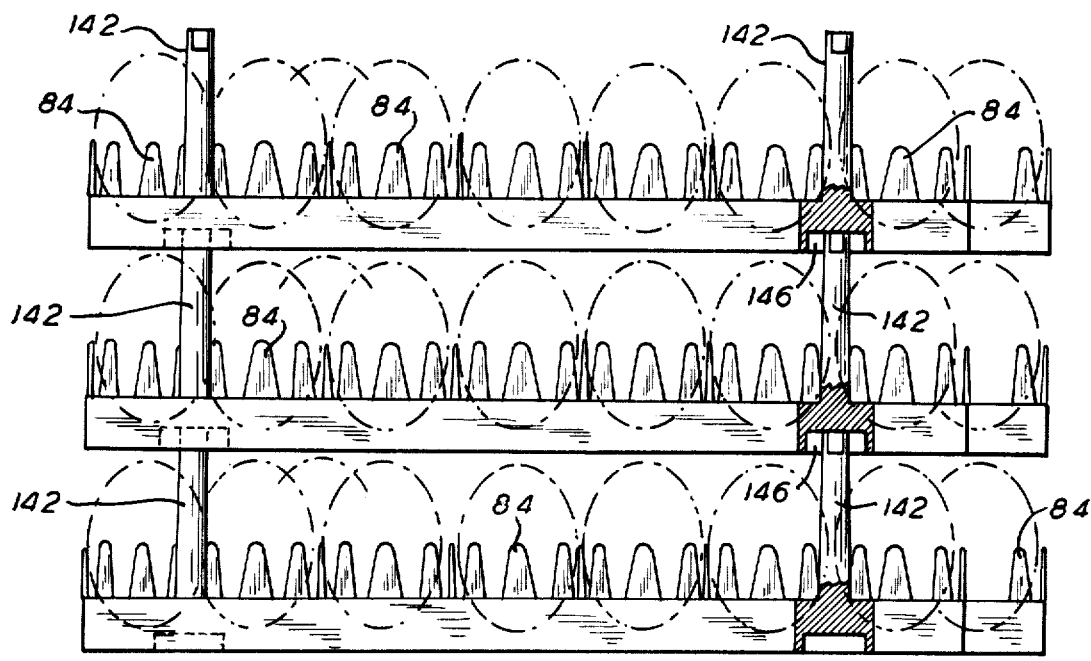

There are also four tubular supports 142 which extend vertically up from the tray. They are cylindrical and taper slightly. Underneath each of these supports 142 is a small recess 146 into which the tips of the struts project when the trays are stacked as shown in FIG. 11.

The slide 82 is used in the same manner with this embodiment as with the embodiment of FIGS. 1–5 to load the trays onto a rack.

It will be appreciated that trays have been disclosed herein which will fit the normal incubator and will provide for incubation of substantially more eggs that can now be accomplished.

While specific embodiments of the invention have been described, it will be appreciated that many modifications thereon may be made by one skilled in the art which falls within the true spirit and scope of the invention.

I claim:

1. An egg incubating tray comprising:
    means defining a plurality of parallel rows of egg cells, said rows being positioned to longitudinally offset the cells in alternate rows by substantially half the length of a cell from the cells in other proximate rows,
    an extremost egg cell in said alternate rows projecting by substantially half the length of a cell beyond the extremost cell in the other proximate rows to define a jagged edge of said tray,
    said jagged edge defined such that a second egg incubating tray having a jagged edge interfits with said egg incubating tray with the extremost egg cells in said alternate rows fitting between extremost projecting egg cells in said second egg incubating tray and the extremost projecting egg cells in said second egg incubating tray fitting between the extremost egg cells in said alternate rows.

2. An egg incubating tray comprising:
    a plurality of parallel struts
    a plurality of ribs interconnecting said struts to define a plurality of parallel rows of egg cells, said ribs being positioned between said struts to longitudinally offset the cells in alternate rows by substantially half the distance between the ribs from the egg cells in the proximate row, and
    an extremost egg cell in said alternate rows projecting by substantially half the distance between ribs beyond the extremost cell in the other proximate rows to define a jagged edge of said tray,
    said jagged edge defined such that a second egg incubating tray having a jagged edge interfits with said egg incubating tray with the extremost egg cells in said alternate rows fitting between extremost projecting egg cells in said second egg incubating tray and the extremost projecting egg cells in said second egg incubating tray fitting between the extremost egg cells in said alternate rows.

3. The egg incubating tray of claim 2 wherein the projection of said extremost cells in alternate rows is trapezoidal in shape.

4. The egg incubating tray of claim 2 wherein the space between projections of said extremost cells in alternate rows is trapezoidal in shape.

5. The egg tray of claim 2 wherein an extremost egg cell in said proximate row projecting by substantially half the distance between ribs beyond the extremost cell in said one row to define a second jagged edge of said tray opposite to said jagged edge of said tray.

6. The egg tray of claim 5 wherein third and fourth edges of said tray are straight and parallel to said rows.

7. The egg tray of claim 6 wherein said jagged edges are formed by constructing said extremost edges of said extremost egg cells with leading walls arranged parallel to said ribs and with side walls formed as extensions of said struts and with angularly disposed walls interconnecting said leading walls and said side walls.

8. The egg tray of claim 6 wherein the jagged configuration is such that a second egg tray of the same configuration will interfit with said egg tray with the projecting egg cells in said egg tray fitting between the projecting egg cells in said second egg tray so that the rows in said trays are colinear.

9. The egg tray of claim 7 including tapered vertically disposed projections, mounted around said egg cells, to aid in supporting an egg and act as a shock absorber for the egg.

10. The egg tray of claim 9 wherein there are six projections mounted on said struts and said ribs.

11. The egg tray of claim 9 including a horizontally disposed projection means extending inwardly in said cell to support an egg.

12. The egg tray of claim 11 wherein the projection means has smooth edges with rounded corners to avoid pointed structures from contacting an egg placed in an egg cell.

13. The egg tray of claim 12 wherein the projection means comprises four projections having smooth straight leading edges with rounded corners at the ends of the leading edges.

14. The egg tray of claim 2 wherein there are seven rows.

15. The egg tray of claim 14 wherein there are six cells in each row.

16. The egg tray of claim 2 wherein there are eight rows.

17. The egg tray of claim 16 wherein there are seven cells in each row.

18. The egg tray of claim 6 wherein a plurality of posts extend vertically up from the top of the tray a distance sufficient to facilitate stacking of one tray upon the other when eggs are disposed therewithin and wherein post receiving means are provided on the underside of each tray to receive an upper end of said posts to facilitate stacking of the trays.

19. The egg tray of claim 18 wherien there are four posts and wherein they are disposed along the straight side edges of the trays.

20. The egg tray of claim 2 wherein slide means are provided for receiving and supporting the egg tray and for facilitating the placement thereof in an incubator rack.

21. The egg tray of claim 8 wherein slide means are provided for receiving and supporting the egg tray and for facilitating the placement thereof in an incubator rack.

22. The egg tray of claim 21 wherein said slide means will support three egg trays in interfitted relationship.

23. The egg tray of claim 22 wherein said slide means is formed from a substantially flat sheet of material with longitudinal edges thereof bent up to add rigidity to the slide.

24. The slide of claim 23 wherein said longitudinal edges extend beyond an edge of the slide to form handles therefor.

25. The egg incubating tray of claim 2 wherein the extremost egg cell in said other proximate rows projecting by substantially half the length of a cell beyond the other extremost cell in said alternate rows to deiine a second jagged edge of said tray opposite to said jagged edge of said tray.

26. The egg incubating tray of claim 6 wherein said tray will fit on a rectangular rack of an incubator having longer and shorter sides with said rows and said third and fourth edges parallel to longer sides of said rack.

27. An egg tray comprising:
a plurality of parallel struts
a plurality of ribs interconnecting said struts to define a plurality of parallel rows of egg cells, said ribs being positioned between said struts to longitudinally offset the cells in one row by substantially half the distance between the ribs from the egg cells in the proximate row, and an extremost egg cell in said one row projecting by substantially half the distance between ribs beyond the extremost cell in the proximate row to define a jagged edge of said tray, wherein an extremost egg cell in said proximate row projecting by substantially half the distance between ribs beyond the extremost cell in said one row to define a second jagged edge of said tray opposite to said jagged edge of said tray, wherein third and fourth edges of said tray are straight and parallel to said rows, wherein said jagged edges are formed by constructing said extremost edges of said extremost egg cells with leading walls arranged parallel to said ribs and with side walls formed as extensions of said struts and with angularly disposed walls interconnecting said leading walls and said side walls, including tapered vertically disposed projections, mounted around said egg cells, to aid in supporting an egg and act as a shock absorber for the egg, wherein there are six projections mounted on said struts and said ribs, wherein four of said tapered vertically disposed projections are mounted two on each of two proximate struts and at an angle with respect to each other and the axis of the strut and wherein the other two tapered vertically disposed projections are mounted on said ribs parallel to the axis of said ribs, said vertically disposed projections forming a circular array and adapted to support a single egg, said projections adapted to aid in supporting six different eggs in adjacent cells, said vertically disposed projections mounted on the struts adapted to support eggs in egg cells in proximate rows and each of said vertically disposed projections mounted on said ribs adapted to support eggs in adjacent cells in the same row.

28. An egg incubating tray comprising:
means defining a plurality of parallel rows of egg cells, said rows being positioned to longitudinally offset the cells in alternate rows by substantially half the length of a cell from the cells in other proximate rows,
an extremost egg cell in said alternate rows having an outer surface which projects by substantially half the length of a cell beyond an outer surface of the extremost cell in the other proximate rows which together with said outer surface of the extremost cell in the other proximate rows defines an open space between said extremost cells in alternate rows of approximately a half cell in size, said outer surface defined such that a second egg incubating tray having and outer surface which interfits with said egg incubating tray with the extremost egg cells in said alternate rows fitting between extremost projecting egg cells in said second egg incubating tray to a depth of approximately half a cell and the extremost projecting egg cells in said second egg incubating tray fitting into the defined open space between the extremost egg cells in said alternate rows.

29. An egg incubating tray comprising:
a plurality of parallel struts
a plurality of ribs interconnecting said struts to define a plurality of parallel rows of egg cells, said ribs being positioned between said struts to longitudinally offset the cells in alternate rows by substantially half the distance between the ribs from the egg cells in the proximate row, and
an extremost egg cell in said alternate rows having an outer surface which projects by substantially half the distance between ribs beyond an outer surface of the extremost cell in the other proximate rows which together with said outer surface of the extremost cell in the other proximate rows defines an open space between said extremost cells in alternate rows of approximately a half cell in size, said outer surface defined such that a second egg incubating tray having an outer surface which interfits with said egg incubating tray with the extremost egg cells in said alternate rows fitting between extremost projecting egg cells in said second egg incubating tray to a depth of approximately half a cell and the extremost projecting egg cells in said second egg incubating tray fitting into the defined open space between the extremost egg cells in said alternate rows.

30. The egg incubating tray of claim 29 wherein said cells in said alternate rows and said other rows forming a diagonal pattern which is such that a second egg incubating tray of the same configuration will interfit with said egg incubating tray with the diagonal pattern sugstantially continuous throughout the two trays.

* * * * *

UNITED STATES PATENT OFFICE
CERTIFICATE OF CORRECTION

Patent No. 4,004,552      Dated January 25, 1977

Inventor(s) Gerd Levin

It is certified that error appears in the above-identified patent and that said Letters Patent are hereby corrected as shown below:

On the cover page, item [45] "Jan. 25, 1974" should read
-- Jan. 25, 1977 --.

Signed and Sealed this

Twenty-ninth Day of November 1977

[SEAL]

Attest:

RUTH C. MASON
Attesting Officer

LUTRELLE F. PARKER
Acting Commissioner of Patents and Trademarks